UNITED STATES PATENT OFFICE.

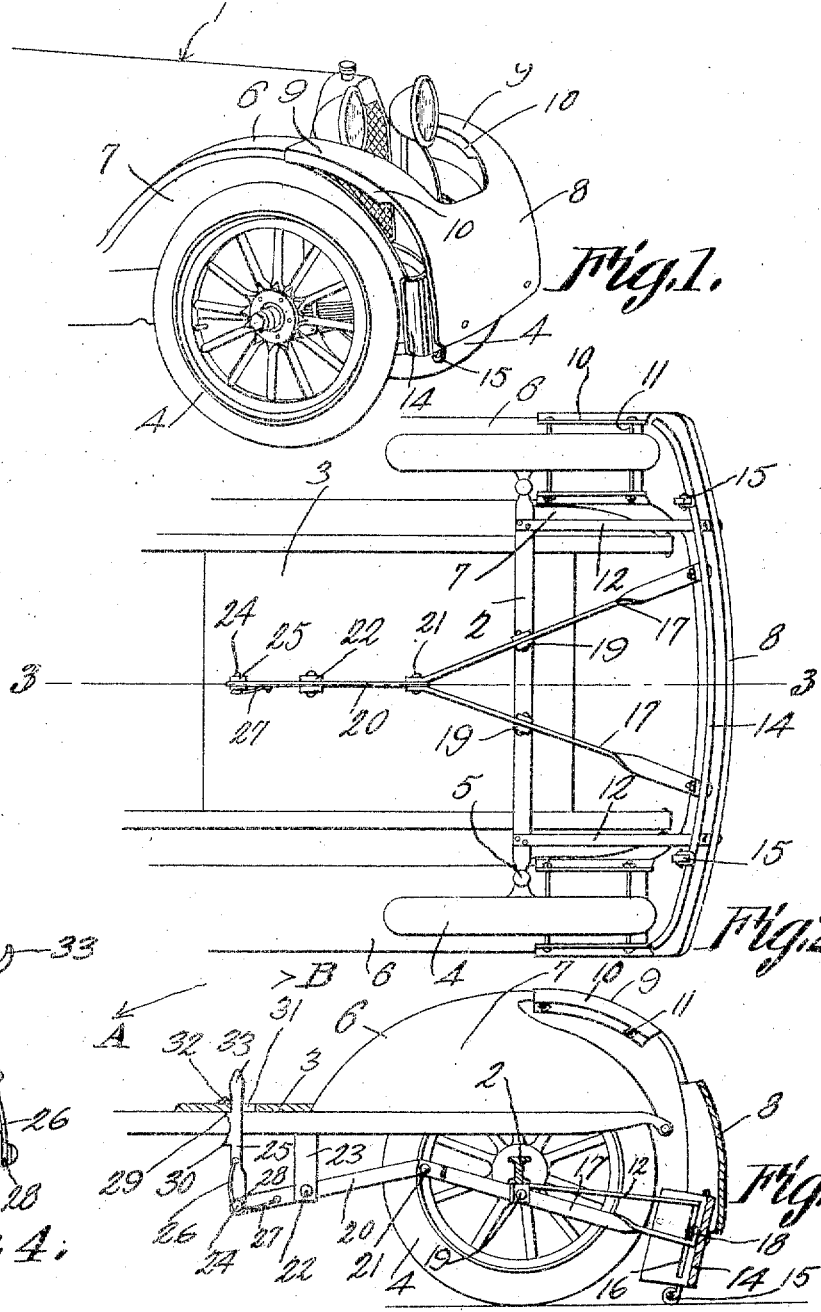

ALFRED POIMIROO AND ANGELINA POIMIROO, OF SEATTLE, WASHINGTON.

AUTO-FENDER.

1,208,204.   Specification of Letters Patent.   Patented Dec. 12, 1916.

Application filed August 5, 1916. Serial No. 113,338.

*To all whom it may concern:*

Be it known that we, ALFRED POIMIROO and ANGELINA POIMIROO, citizens of the United States, residing at Seattle, in the county of King, State of Washington, have invented a new and useful Auto-Fender, of which the following is a specification.

The device forming the subject matter of this application is a fender for a vehicle, and one object of the invention is to provide novel means for assembling the upper member of the fender with the vehicle.

Another object of the invention is to provide novel means for raising and lowering the lower fender and to provide novel means for holding the lower member in raised and lowered positions.

Another object of the invention is to provide novel means for directing the vertical movement of the lower fender.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings, Figure 1 shows in perspective, a motor propelled vehicle whereunto the device forming the subject matter of this application has been applied; Fig. 2 is a bottom plan of the vehicle shown in Fig. 1; Fig. 3 is a section on the line 3—3 of Fig. 1; and Fig. 4 is a fragmental elevation showing the actuating member for the lower fender.

In the accompanying drawings, the numeral 1 designates a portion of a vehicle, having an axle 2 and including a platform 3. The axle 2 carries ground wheels 4 which are pivotally connected as shown at 5 with the ends of the axle 2 in a manner common in motor propelled vehicles. The usual arched mud guards 6 are fixed above the wheels 4 and may include depending wings 7 located between the wheels and the body portion of the vehicle.

In carrying out the present invention there is provided an upper fender 8 which, ordinarily, is arched both horizontally and vertically. The fender 8 may be a sheet of metal, or it may be of any other suitable material. The upper fender 8 includes rearwardly extended arms 9 superposed on the forward ends of the mud guards 6. The longitudinal edges of the arms 9 are bent to extend beneath the mud guards 6, as clearly indicated in Fig. 2, and are provided with depending flanges 10. The flanges 10 of each arm 9 of the upper fender 8 are connected by clamp bolts 11, or in any other suitable way, and thus the upper fender 8 is securely held in place on the mud guards 6. The forward ends of braces 12 are connected with the upper fender 8 adjacent its lower edge, the rear ends of the braces 12 being secured to the axle 2.

The invention comprises a lower fender 14 located to the rear of the upper fender 8. The lower fender 14 may be a sheet of a metal, or it may be of any other desired construction. The lower fender 14 preferably is curved horizontally, to approximate the horizontal curvature of the upper fender 8, the fenders 8 and 14 being spaced apart slightly, longitudinally of the vehicle, as shown in Fig. 2. Attached to the lower edge of the fender 14 are wheels 15 adapted to ride along the ground when the fender 14 is lowered. The wheels 15 may be omitted if desired. The lower fender 14 is provided with vertical guide slots 16 receiving the braces 12 which connect the upper fender 8 with the axle 2. The braces 12 thus serve as a means for guiding the vertical movement of the lower fender 14.

The invention comprises a pair of rearwardly converging levers 17. The forward ends of these levers are secured as shown at 18 to the lower fender 14. Intermediate their ends, the levers 17 are fulcrumed as shown at 19 on the axle 2.

The numeral 20 designates a rear lever, the forward end of which is received between the rear ends of the levers 17. A pivot element 21 unites the rear ends of the levers 17 and the forward end of the lever 20. The lever 20 is fulcrumed intermediate its ends as shown at 22 on a hanger 23 which depends from the platform 3. Mounted in the rear end of the lever 20 is a pivot element 24. A substantially vertical actuating member which may be a rod or bar is mounted on the pivot element 24 for a limited swinging movement on a vertical plane.

The invention comprises a spring including an arm 26, an arm 27, and an eye 28 connecting the arms. The eye 28 is engaged around the pivot element 24, the end of the arm 27 being secured to the lever 20, and the end of the arm 26 being secured to the actuating member 25. The function of the spring comprising the parts 26, 27 and 28 is to swing the upper end of the actuating member 25 rearwardly in the direction of the arrow A in Fig. 3. On the rear edge of the actuating member 25 there are shoulders 29 and 30. The actuating member 25 moves vertically in a hole 31 in the platform 3. A keeper plate 32 may be attached to the upper face of the platform 3 behind the hole 31. The upper end of the actuating member 25 is provided with a foot piece 33.

When the lower fender 14 is lowered as shown in Fig. 3, the coöperation between the parts is as follows: If the wheels 15 are used, the same engage or are located closely adjacent to the surface of the ground. The braces 12 may lie at the upper ends of the guide slots 16 thus to aid in supporting the lower fender 14. The shoulder 29 on the actuating member 35 is held beneath the platform 3 by the action of the spring 26—27, and thus the fender 14 is held positively in a lowered position.

When it is desired to raise the lower fender 14, the actuating member 25 at its upper end is swung forwardly in the direction of the arrow B. This operation disengages the shoulder 29 from the platform 3, and the actuating-member 25 may be pulled upwardly through the hole 31. When the actuating member 35 is pulled upwardly, the forward end of the lever 20 is depressed and the forward ends of the levers 17 are raised, thus elevating the lower fender 14, the slots 16 in the lower fender permitting the necessary raising movement of the lower fender with respect to the braces 12. When the lower fender 14 is raised as above described, the shoulder 30 on the actuating member 25 is engaged with the plate 32 on the platform 3, the engagement between the shoulder 30 and the plate being maintained by the action of the spring 26—27. Thus, the fender 14 is held in an uplifted position.

When it is desired to lower the fender 14 suddenly, the upper end of the actuating member 25 is pushed forwardly in the direction of the arrow B. This operation disengages the shoulder 30 of the plate 32, and the fender 14 moves downwardly under its own weight, the parts reassuming the positions of Fig. 3.

It is to be observed that the structure forming the subject matter of this application serves to receive a considerable portion of shock when an obstacle is struck, thus reducing the impact to a minimum, so far as the car proper is concerned. The device is of use in protecting the radiator, lamps, and other adjuncts on the vehicle. When the structure is in the position shown in Fig. 3, an object struck by the fender cannot readily pass beneath the wheels of the vehicle, but will be pushed forwardly, along with the fender.

Having thus described the invention, what is claimed is:—

1. In a device of the class described, a vehicle comprising wheels; mud guards carried by the vehicle and located above the wheels and including fender extended in front of the vehicle and including rearwardly extended arms engaged with the mud guards; means for connecting the arms detachably with the mud guards; a lower fender mounted to move upwardly and downwardly with respect to the upper fender; and vehicle carried means for raising and lowering the lower fender.

2. In a device of the class described, a vehicle; an upper fender located in front of the vehicle; a brace connecting the upper fender and the vehicle; a lower fender mounted to move upwardly and downwardly with respect to the upper fender and including a guide slot receiving the brace; and vehicle carried means for raising and lowering the lower fender.

3. In a device of the class described, a vehicle including an axle; an upper fender located in front of the vehicle; a brace connecting the upper fender with the axle; a lower fender mounted to move upwardly and downwardly with respect to the upper fender and provided with a guide slot receiving the brace; and vehicle carried means for raising and lowering the lower fender.

4. In a device of the class described, a vehicle; a forward lever fulcrumed intermediate its ends on the vehicle; a fender carried by the forward end of the forward lever; a rear lever fulcrumed intermediate its ends on the vehicle; means for pivotally connecting the rear end of the forward lever with the forward end of the rear lever; an upwardly extended actuating member pivoted at its lower end to the rear end of the rear lever; and interengaging elements on the vehicle and the actuating member for holding the fender in adjusted positions.

5. In a device of the class described, a vehicle; a fender located in front of the vehicle; a forward lever fulcrumed intermediate its ends on the vehicle and having its forward end connected with the fender; rear lever fulcrumed intermediate its end on the vehicle and having its forward end pivoted to the rear end of the forward lever an upstanding actuating member pivoted its lower end to the rear end of the rea lever; interengaging elements on the actuating member and the vehicle for holding the actuating member in adjusted positions; and spring means coacting with the actuating member to hold said interengaging elements in coöperating relation.

In testimony that we claim the foregoing as our own, we have hereto affixed our signatures in the presence of two witnesses.

ALFRED POIMIROO.
ANGELINA POIMIROO.

Witnesses:
J. H. NEWBERGER,
A. T. POMERY.